United States Patent [19]
Cockerham

[11] Patent Number: 5,950,949
[45] Date of Patent: Sep. 14, 1999

[54] ADJUSTABLE BRAKE FOR BAITCAST REEL

[75] Inventor: Rayford A. Cockerham, Broken Arrow, Okla.

[73] Assignee: Zebco Division of Brunswick Corporation, Tulsa, Okla.

[21] Appl. No.: 08/845,703

[22] Filed: Apr. 25, 1997

[51] Int. Cl.[6] .............................................. A01K 89/0155
[52] U.S. Cl. ...................... 242/289; 242/288; 242/301; 188/181 A; 188/180; 188/184; 188/185; 188/189
[58] Field of Search ..................... 242/289, 288, 242/301; 188/181 A, 180, 184, 185, 189

[56] References Cited

U.S. PATENT DOCUMENTS

| | | | |
|---|---|---|---|
| Re. 26,542 | 3/1969 | Popper | 188/185 |
| 2,482,863 | 9/1949 | Nelson | 188/185 |
| 2,489,447 | 11/1949 | Borgstrom | 242/289 |
| 3,477,659 | 11/1969 | Morrit | 242/289 |
| 5,108,042 | 4/1992 | Puyear et al. | 242/289 |
| 5,118,049 | 6/1992 | Roberts et al. | 242/268 |
| 5,217,182 | 6/1993 | Puryear et al. | 242/321 |
| 5,275,353 | 1/1994 | Morimoto | 242/261 |
| 5,301,899 | 4/1994 | Sato | 242/288 |
| 5,305,967 | 4/1994 | Sato | 242/261 |
| 5,308,021 | 5/1994 | Ikuta | 242/289 |
| 5,344,098 | 9/1994 | Roberts | 242/261 |
| 5,749,534 | 5/1998 | Morimoto | 242/288 |
| 5,803,385 | 9/1998 | Baisch | 242/289 |

FOREIGN PATENT DOCUMENTS

| | | | |
|---|---|---|---|
| 137 333 | 9/1952 | Switzerland | 242/289 |

*Primary Examiner*—Donald P. Walsh
*Attorney, Agent, or Firm*—Fellers, Snider, Blankenship, Bailey & Tippens, P.C.

[57] ABSTRACT

A braking apparatus for a fishing reel comprising: a plurality of braking elements; a braking element assembly for retaining the braking elements in radial paths about a rotational axis such that a centrifugal force imparted to the braking elements by rotating the braking elements about the rotational axis will urge the braking elements to move in their radial paths away from the rotational axis toward individual, extended radial positions; a contact member; and a positioning mechanism for selectively positioning the contact member in at least a first location and a second location. When the contact member is positioned in its first location and the braking elements are in their extended radial positions, at least one of the braking elements contacts the contact member. However, when the contact member is positioned in its second location, the one braking element just mentioned cannot contact the contact member, regardless of whether the braking element is in its extended radial position. The braking element assembly used in the inventive apparatus preferably comprises: (a) a housing having the above-mentioned rotational axis extending longitudinally therethrough and having an outer wall positioned around the rotational axis and (b) a plurality of radial slots provided in the housing and having slot openings extending through the outer wall. Preferably, the braking elements are slidably retained in the housing slots at different longitudinal positions along the rotational axis.

22 Claims, 10 Drawing Sheets

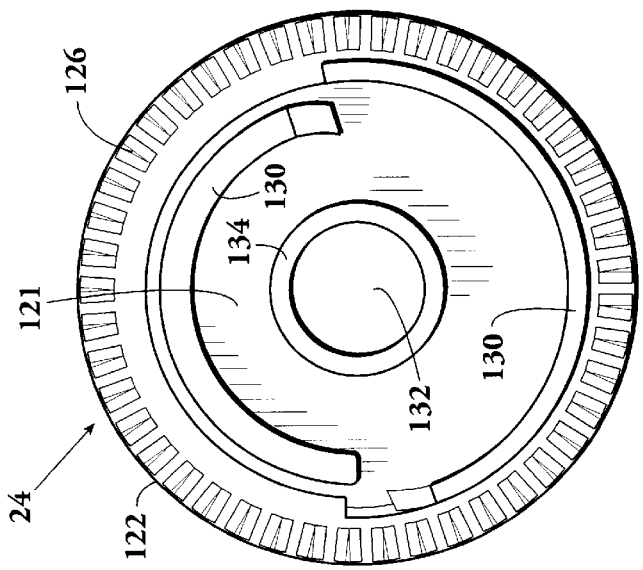
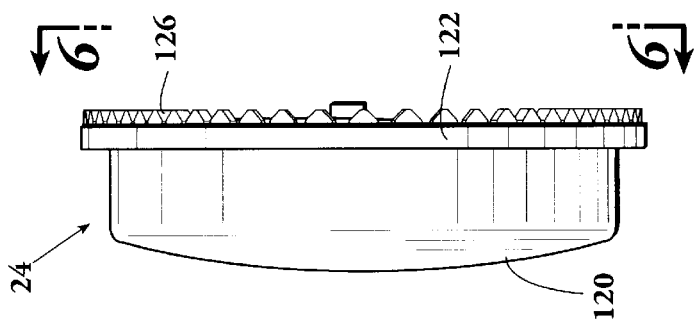
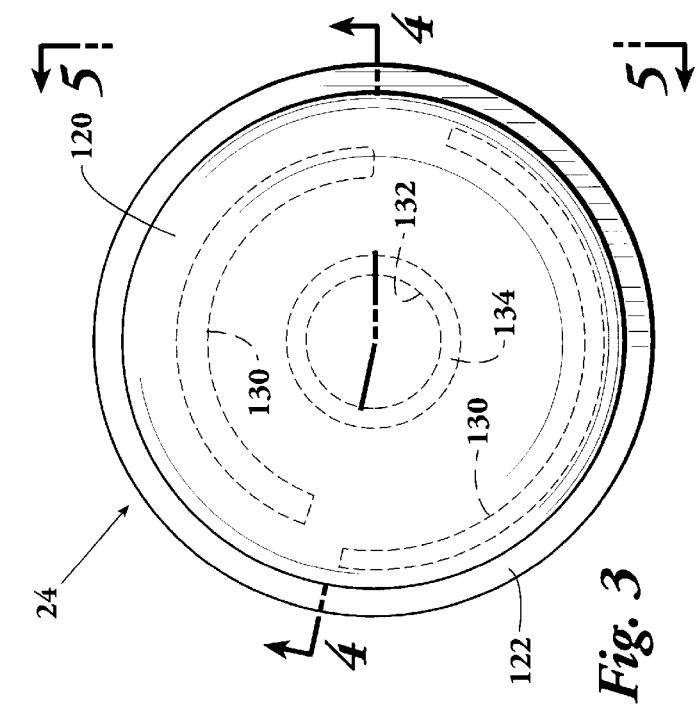
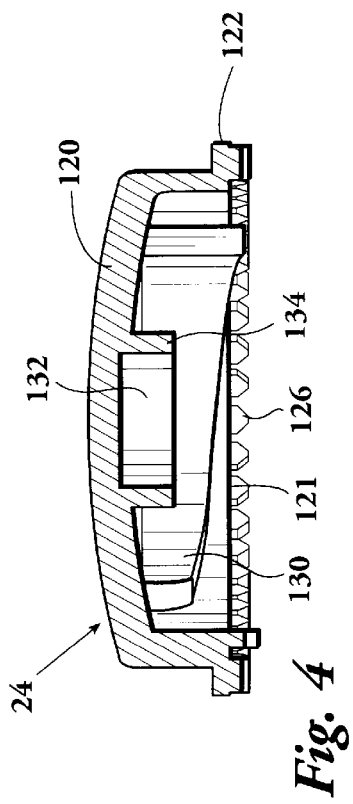
Fig. 6
Fig. 5
Fig. 3
Fig. 4

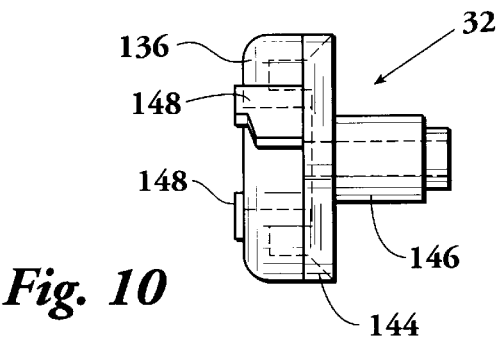
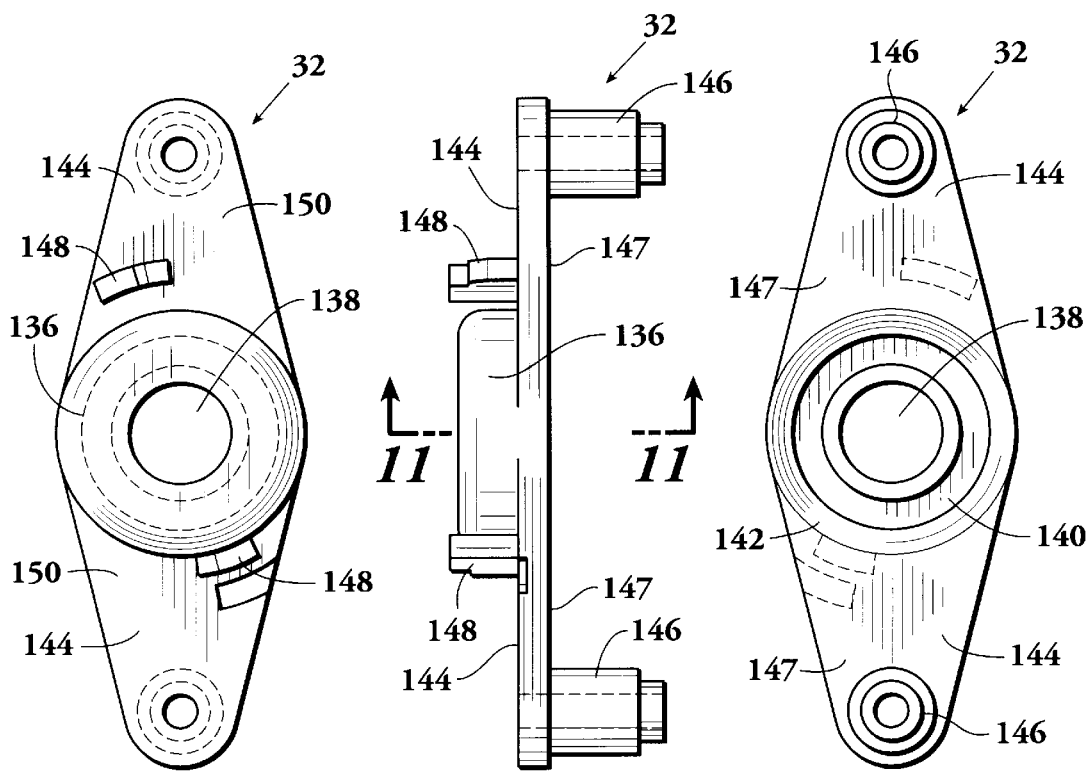
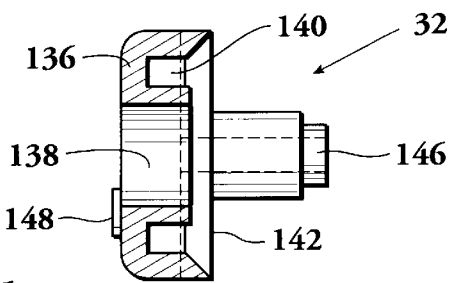

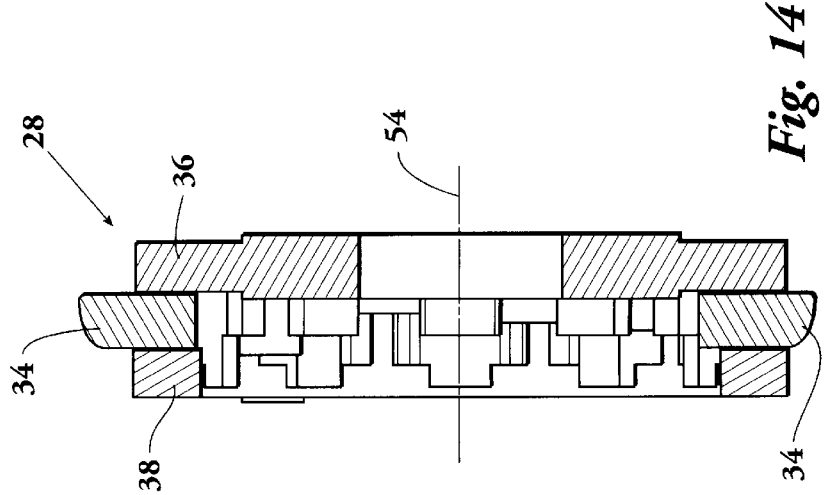
*Fig. 14*
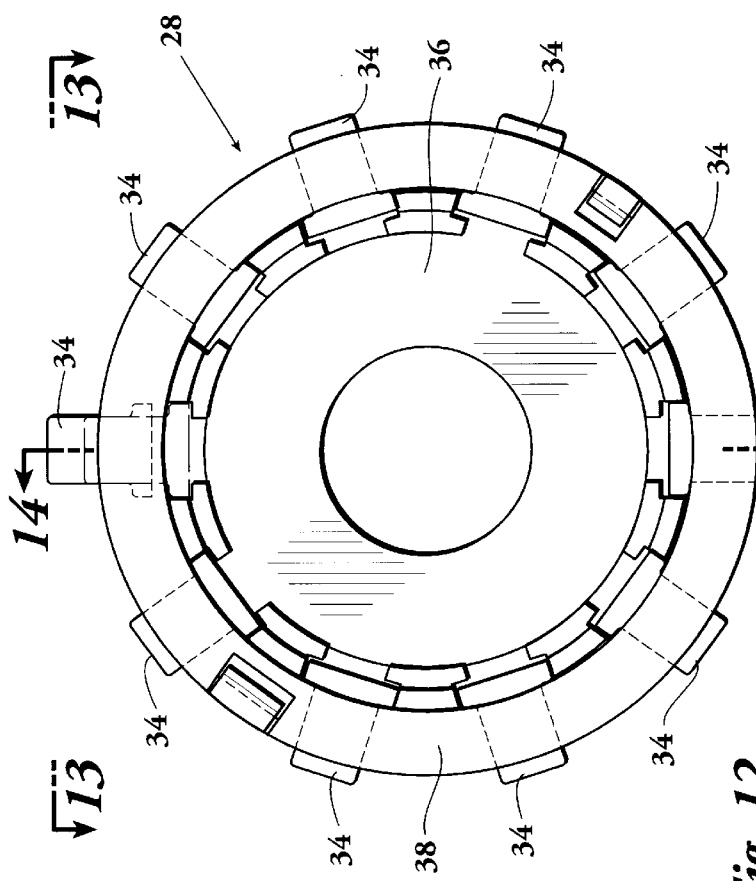
*Fig. 13*
*Fig. 12*

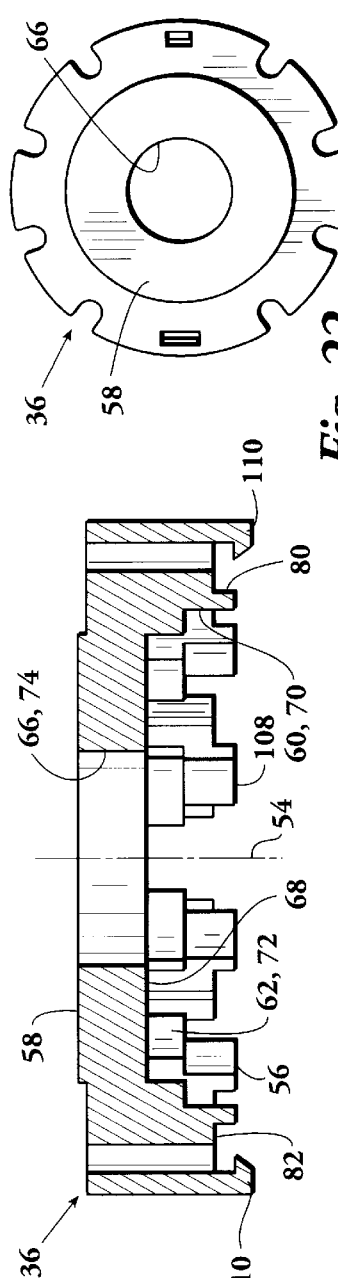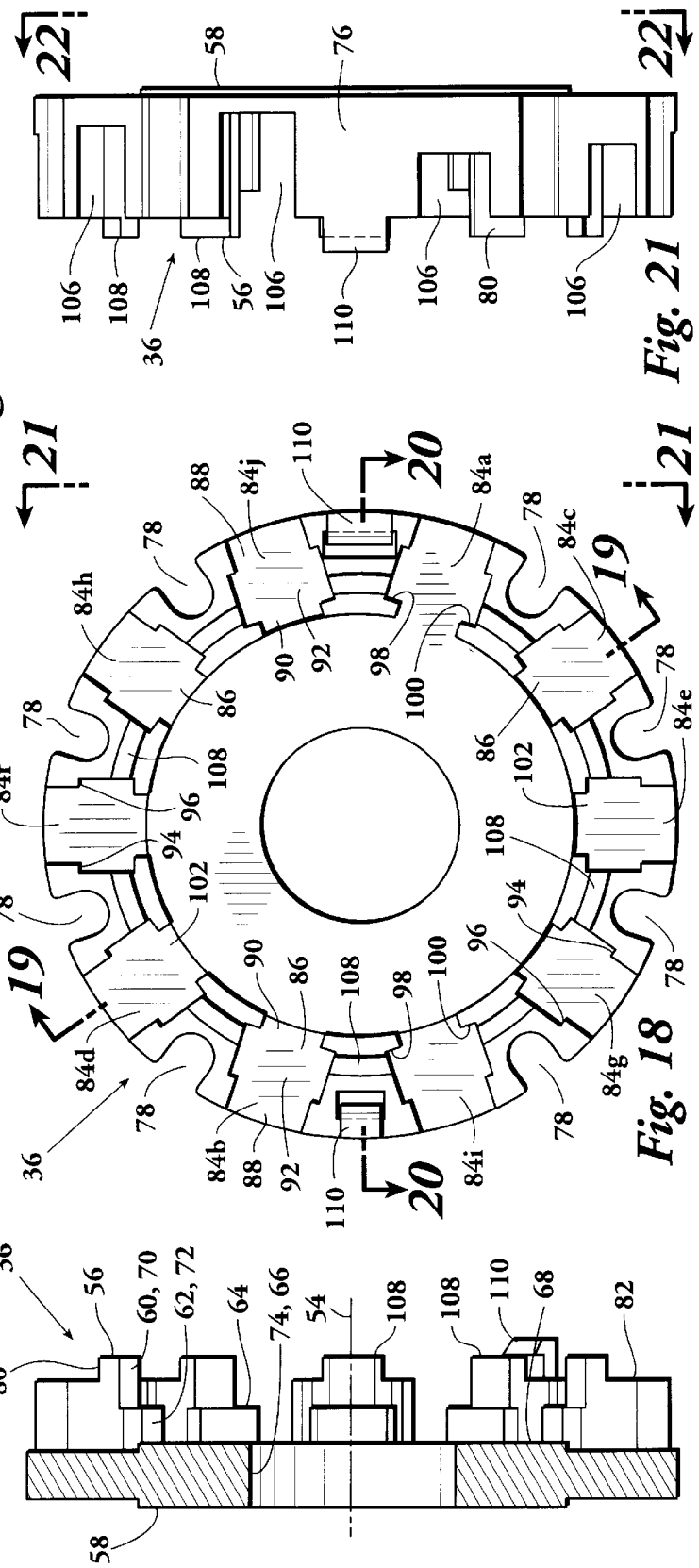

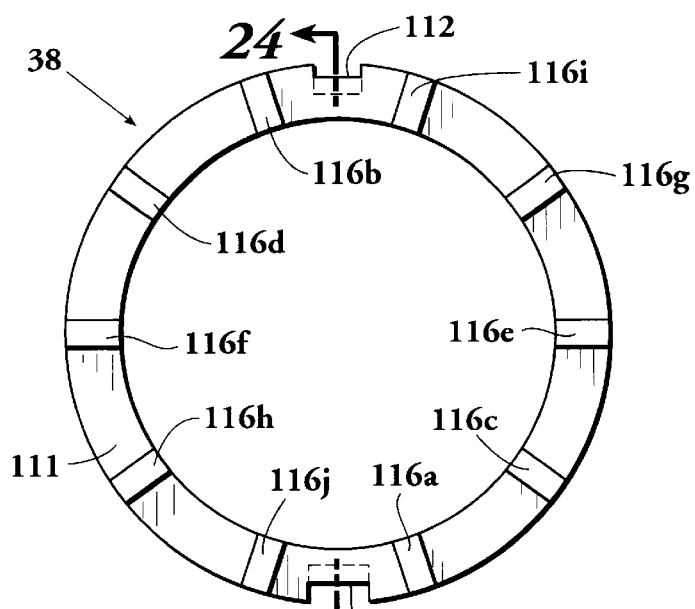
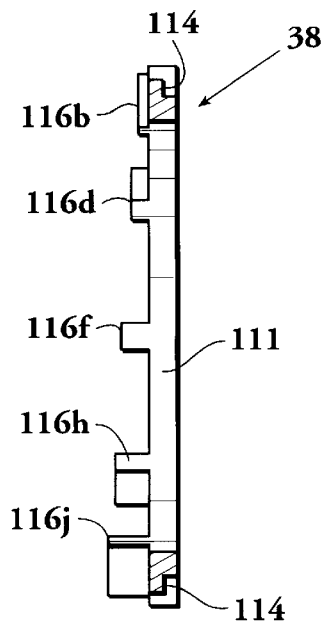
Fig. 23  Fig. 24
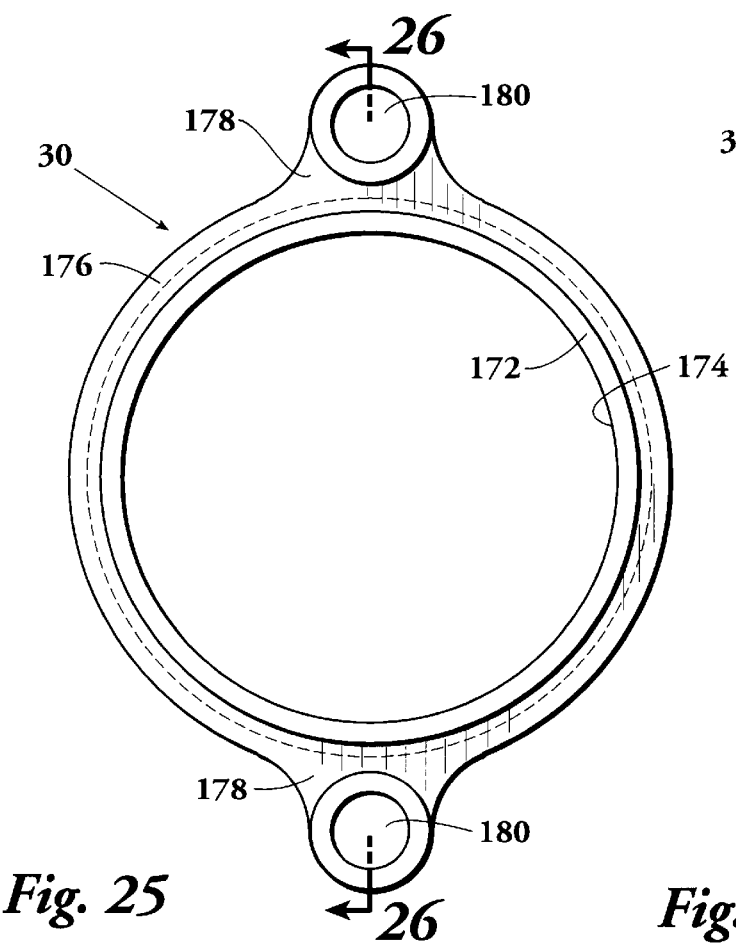
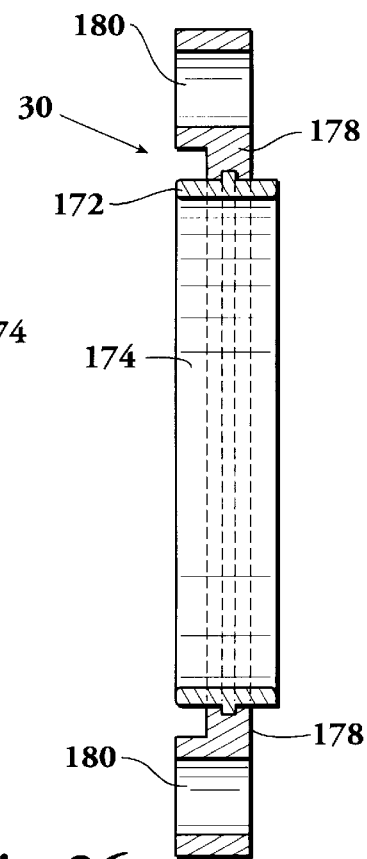
Fig. 25  Fig. 26

ADJUSTABLE BRAKE FOR BAITCAST REEL

FIELD OF THE INVENTION

The present invention relates to braking systems for fishing reels. More particularly, but not by way of limitation, the present invention relates to adjustable, centrifugal braking systems for baitcast fishing reels.

BACKGROUND OF THE INVENTION

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear provided on the spool shaft; a manually rotatable crank handle; a gear train and crankshaft assembly mechanically linking the crank handle to the spool shaft pinion gear; a level-wind mechanism which transverses the spool during winding to ensure that the fishing line is evenly wound along the length of the spool shaft; an anti-reverse mechanism for preventing reverse rotation of the crank handle and spool; a clutch mechanism for disengaging the pinion gear from the spool shaft to allow the spool to rotate freely during casting; an exterior actuator (typically a thumb lever) for engaging the clutch; and a spool drag or spool braking mechanism.

In most cases, right and left side covers are removably attached to the frame side plates for housing the various reel operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover.

For sake of convenience, a right-handed perspective is used in describing the various reels and reel components discussed herein. As will be understood by those skilled in the art, a left-handed version of generally any baitcasting reel can be produced by simply reversing the arrangement of the reel's components such that the left-handed reel is a mirror image of the right-handed version of the reel.

Spool drag or spool braking systems are commonly used in baitcasting reels to alleviate line backlashing problems which can occur during casting. Because they utilize transversely-oriented spools, baitcasting reels are more prone to backlashing problems than are spinning reels and spin-casting reels. Such problems result primarily from the rotational momentum carried by the spool during casting. The most common types of drag/braking mechanisms used in baitcasting reels are magnetic drag systems and centrifugal braking systems.

U.S. Pat. No. 5,108,042 discloses an adjustable, magnetic drag mechanism housed within the left side cover of a baitcast reel. The mechanism operates by applying an adjustable, magnetic drag force to the left end of reel spool. The magnetic force slows the rotation of the spool during casting. The magnetic drag mechanism of U.S. Pat. No. 5,108,042 comprises: a magnet carrier ring having a plurality of permanent magnets attached thereto; an axially movable cam disc to which the magnet carrier ring is secured; and an adjustment dial projecting through a recess in the left cover. The mounting of the carrier ring on the cam disc is such that the carrier ring is positioned adjacent the left end of the spool. The dial is operatively associated with the cam disc for selectively adjusting the amount of magnetic drag force applied to the spool by moving the carrier ring toward and away from the spool.

Unfortunately, the amount of drag force imparted by this type of magnetic system is not affected by the rotational speed of the spool. Rather, for any selected magnet position, the magnetic drag system imparts a constant magnetic dragging force. Thus, for example, when the user has been casting a short distance and then decides to cast a long distance, the user must either adjust the magnetic drag system prior to making the long cast or compensate the constant magnetic drag force during the long cast by applying thumb pressure to the reel spool.

U.S. Pat. No. 5,308,021 discloses a centrifugal braking system commonly used in baitcasting reels. The centrifugal braking system is composed of: a plurality of rod-like members projecting radially from the end of the spool shaft; a plurality of tubular braking pieces or weights slidably mounted on the rod-like members; and a fixed brake ring encompassing the distal ends of the rod-like members. When the spool shaft rotates, the braking pieces move outwardly on the rod-like members into frictional contact with the brake ring. This frictional contact provides a braking force which slows the rotation of the spool.

The centrifugal braking system desirably exerts a braking force which varies in proportion to the rotational speed of the reel spool. Unfortunately, however, to make even minor adjustments to the centrifugal system (e.g., to account for the use of a heavier or lighter lure), the left side of the reel must be disassembled and the individual braking pieces must be individually manipulated. Typically, the individual pieces can be snapped into fixed position adjacent the spool shaft whereby the pieces are prevented from sliding into frictional contact with the brake disc. Alternatively, the individual braking pieces can be either replaced or removed.

In addition to such adjustment problems, tubular-type braking element assemblies of the type used in U.S. Pat. No. 5,308,021 (a) require a relatively large amount of space, (b) are easily damaged (e.g., by bending the rods while making system adjustments), and (c) easily become unbalanced.

U.S. Pat. No. 5,308,021 discloses a centrifugal braking system wherein the braking force exerted by the system can be selectively adjusted by operating a dial mechanism positioned under the left cover of the reel. Like the standard centrifugal braking system discussed above, the U.S. Pat. No. 5,308,021 system utilizes a plurality of individual tubular, braking pieces slidably mounted on radial, rod-like members projecting from the end of the spool shaft. However, rather than using a fixed braking ring, the U.S. Pat. No. 5,308,021 system employs an axially movable braking structure. Additionally, rather than having a strictly cylindrical braking surface, the U.S. Pat. No. 5,308,021 braking structure presents an initial frusto-conical braking surface which diverges toward a small diameter, cylindrical braking surface. Further, the roughness of the braking surface varies such that the frictional coefficient provided by the surface increases as the surface is adjusted axially toward the braking elements. Thus, the degree of frictional braking force provided by the U.S. Pat. No. 5,308,021 system can be adjusted by axially shifting the point of contact between the braking structure and the braking pieces.

Unfortunately, the U.S. Pat. No. 5,308,021 system uses only a tubular-type braking element assembly and is therefore subject to the space, damage, and balance problems discussed above. Further, unless the U.S. Pat. No. 5,308,021 reel is disassembled and the individual braking elements are either removed or locked into position adjacent to the spool shaft, the U.S. Pat. No. 5,308,021 system cannot be adjusted such that the individual braking pieces are completely prevented from contacting any portion of the braking surface. Moreover, the production of a braking surface of the type employed in U.S. Pat. No. 5,308,021 having a varying degree of roughness would be both difficult and costly.

A braking system of the type employed in U.S. Pat. No. 5,308,021 is also likely to produce significant noise problems. The tubular braking elements used in the U.S. Pat. No. 5,308,021 system will spin and wear when contacting either an inclined surface or a surface having a progressively increasing coefficient of friction. Such spinning and wear will likely cause the tubular braking elements to rattle. A substantial amount of rattle will likely also occur when the braking elements frictionally contact the rougher portions of the braking surface.

SUMMARY OF THE INVENTION

The present invention provides an adjustable braking apparatus and a braking element assembly especially suited for use in the inventive braking apparatus. The inventive braking apparatus and the inventive braking element assembly satisfy the needs and alleviate the problems mentioned above. As with other centrifugal braking systems heretofore used in the art, the inventive braking system provides a proportional braking force which desirably varies in relation to the rotational speed of the reel spool. However, the inventive system requires less space than previous systems and provides easy adjustment without disassembly and without having to remove the reel side cover. The inventive system also allows the use of a greater number of braking elements and provides a wider range of frictional settings. Additionally, in the inventive system, individual braking pieces can be taken completely out of braking position by means of simple external adjustment. Further, compared to prior tubular-type braking element assemblies, the inventive braking element assembly is sturdier, more stable, and much less susceptible to damage.

The inventive braking apparatus comprises a contact member selectively positionable in at least a first location and a second location. The contact member's second location is different from its first location. The inventive apparatus further comprises a plurality of braking elements having individual braking positions for contacting the contacting member and thereby creating a frictional braking force. The braking elements are radially positioned about a rotational axis. When the contact member is positioned in its first location and the braking elements are in their individual braking positions, at least one of the braking elements contacts the contact member. However, when the contact member is positioned in its second location, said one braking element cannot contact the contact member regardless of whether said one braking element is in its individual braking position.

The inventive braking apparatus preferably comprises: a plurality of braking elements; a contact member; retaining means for retaining the braking elements in radial paths about a rotational axis such that a centrifugal force imparted to the braking elements by rotating the braking elements about the rotational axis will urge the braking elements to move directionally in their radial paths away from the rotational axis toward extended radial positions; and positioning means for selectively positioning the contact member in at least a first location and a second location. When the contact member is positioned in its first location and the braking elements are in their extended radial positions, at least one of the braking elements contacts the contact member. However, when the contact member is positioned in its second location, said one braking element cannot contact the contact member regardless of whether said one braking element is in its extended radial position.

The braking element assembly provided by the present invention is particularly well suited for use in the inventive braking apparatus. The inventive braking element assembly comprises: a housing having a longitudinal axis and an outer wall positioned around the longitudinal axis; a plurality of radial slots provided in the housing and having slot openings extending through the outer wall; and a plurality of braking elements slidably retained in the slots for radial movement toward and away from the longitudinal axis. The braking elements have distal ends positioned away from the longitudinal axis. When a centrifugal force is imparted to the braking elements by rotating the housing about the longitudinal axis, the centrifugal force will urge the braking elements to move radially away from the longitudinal axis toward extended radial positions. Additionally, at least when the braking elements are in their extended radial positions, the distal ends of the braking elements will project radially from the outer wall through the slot openings.

In another aspect, the inventive braking element assembly comprises a plurality of braking elements retained radially about a rotational axis wherein: a first one of the braking elements has a first longitudinal axis lying in a first plane perpendicular to the rotational axis; a second one of the braking elements has a second longitudinal axis lying in a second plane perpendicular to the rotational axis; and the second plane is spaced apart from the first plane.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 3 provides a forward end view of a brake dial 24 used in the inventive braking apparatus.

FIG. 4 provides a cutaway view of brake dial 24 as seen from perspective 4—4, shown in FIG. 3.

FIG. 5 provides a side view of brake dial 24 as seen from perspective 5—5 shown in FIG. 3.

FIG. 6 provides a rearward end view of dial 24 as seen from perspective 6—6 shown in FIG. 5.

FIG. 7 provides a forward end view of a cam slider 32 used in the inventive braking apparatus.

FIG. 8 provides a side view of cam slider 32.

FIG. 9 provides a rearward end view of ca m slider 32.

FIG. 10 provides a side view of camp slider 32.

FIG. 11 provides a sectional view of cam slider 32 as seen from perspective 11—11 shown in FIG. 8

FIG. 12 provides an elevational forward end view of an embodiment 28 of the brake element assembly provided by the present invention.

FIG. 13 provides a side view of inventive brake element assembly 28 as seen from perspective 13—13 shown in FIG. 12.

FIG. 14 provides a sectional view of inventive brake element assembly 28 as seen from perspective 14—14, shown in FIG. 12.

FIG. 18 provides an elevational forward end view of a housing 36 used in inventive brake element assembly 28.

FIG. 19 provides a sectional view of housing 36 as seen from perspective 19—19 shown in FIG. 18.

FIG. 20 provides a sectional view of housing 36 as seen from perspective 20—20 shown in FIG. 18.

FIG. 21 provides a side view of housing 36 as seen from perspective 21—21 shown in FIG. 18.

FIG. 22 provides a rearward end view of housing 36 as seen from perspective 22—22 shown in FIG. 21.

FIG. 23 provides a rearward view of a housing cover 38 used in inventive brake element assembly 28.

FIG. 24 provides a sectional view of housing cover 38 as seen from perspective 24—24 shown in FIG. 23.

FIG. 25 provides a forward view of a brake ring assembly 30 used in the inventive braking apparatus.

FIG. 26 provides a sectional view of brake ring assembly 30 as seen from perspective 26—26 shown in FIG. 25.

DESCRIPTION OF THE PREFERRED EMBODIMENTS

Figure 1:
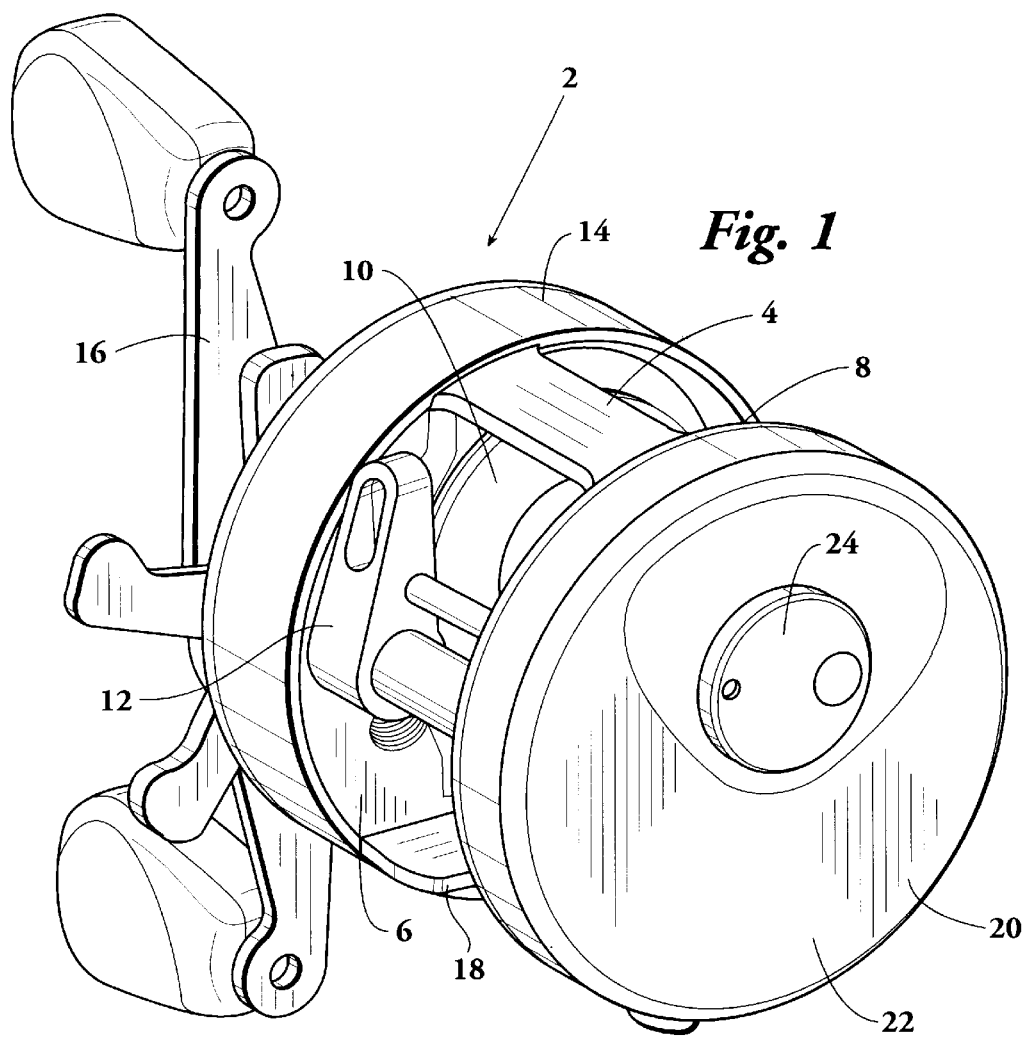
FIG. 1 provides a perspective view of a baitcasting reel 2 having the inventive braking apparatus incorporated therein.

Depicted in FIG. 1 is a baitcasting reel 2 incorporating a preferred embodiment of the inventive, adjustable, centrifugal braking apparatus. Baitcasting reel 2 is a round, right-handed reel comprising: a split frame 4 having a right side plate 6 and a left side plate 8; a line spool 10 rotatably mounted in frame 4 between side plates 6 and 8; a level-wind mechanism 12 which traverses the spool during winding and guides the fishing line to ensure that the line is evenly wound along the entire length of the spool; a right side cover 14 secured over side plate 6; a crank handle 16, operably extending from right cover 14, for rotating spool 10; a reel foot 18 provided on the bottom of frame 4 for attaching reel 2 to a fishing rod; and a left side cover 20 secured over left side plate 8. The outside surface 22 of left side cover 20 is substantially smooth. The inventive braking apparatus is housed under left side cover 20. When reel 2 is assembled, the only externally visible feature of the inventive braking apparatus is a brake dial 24 projecting through a circular aperture 26 formed in left cover 20.

Although, for convenience, the inventive apparatus is herein described as incorporated in a right-handed baitcasting reel, the inventive apparatus is equally adaptable for use in left-handed baitcasting reels.

As best seen in FIGS. 2 and 27–30, the inventive braking apparatus preferably comprises: brake dial 24; an inventive braking element assembly 28; a brake ring assembly 30; and a cam slider 32. Inventive brake element assembly 28 preferably comprises: a plurality of brake elements (preferably braking pads or weights) 34; a brake element housing 36; and a housing cover 38.

Figure 17:
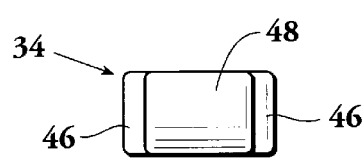
FIG. 17 provides a distal end view of brake pad 34.
Figure 16:
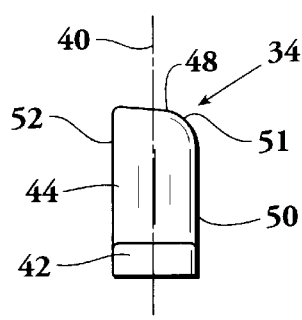
FIG. 16 provides an elevational side view of brake pad 34.
Figure 15:
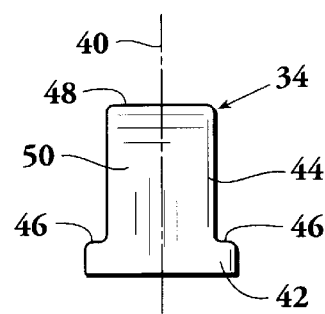
FIG. 15 provides an elevational forward view of a brake pad 34 used in inventive brake element assembly 28.
Figure 2:
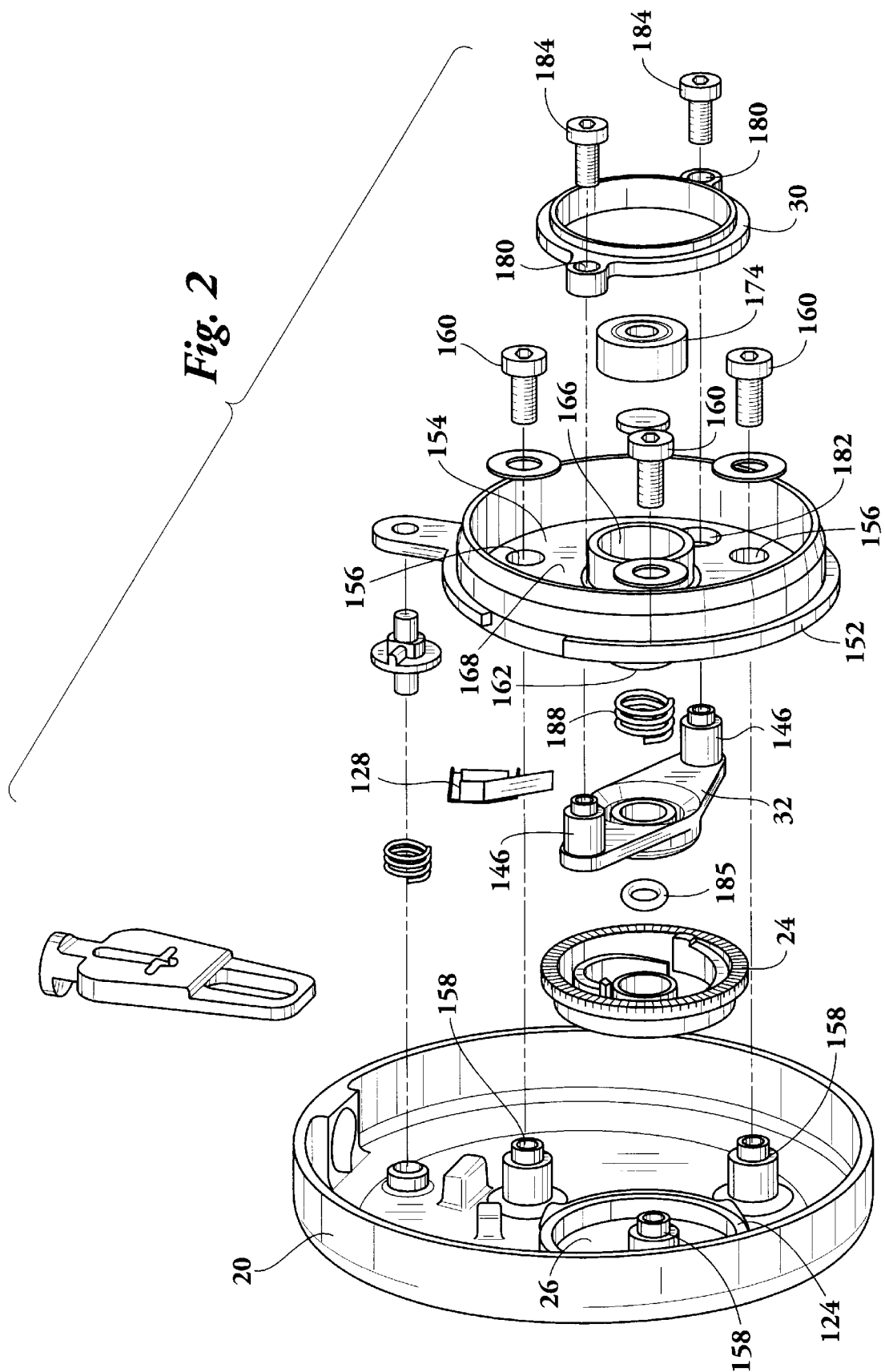
FIG. 2 provides an exploded, perspective view of the left side cover assembly of baitcasting reel 2.
Figure 28:
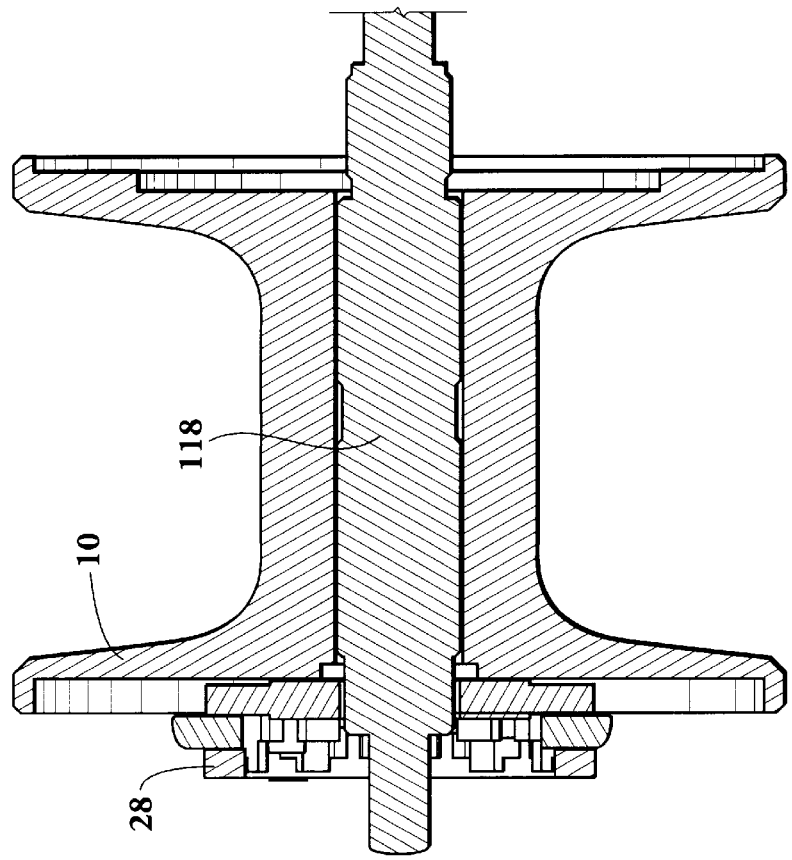
FIG. 28 provides a sectional view of a spool assembly as seen from perspective 28—28 shown in FIG. 27.
Figure 27:
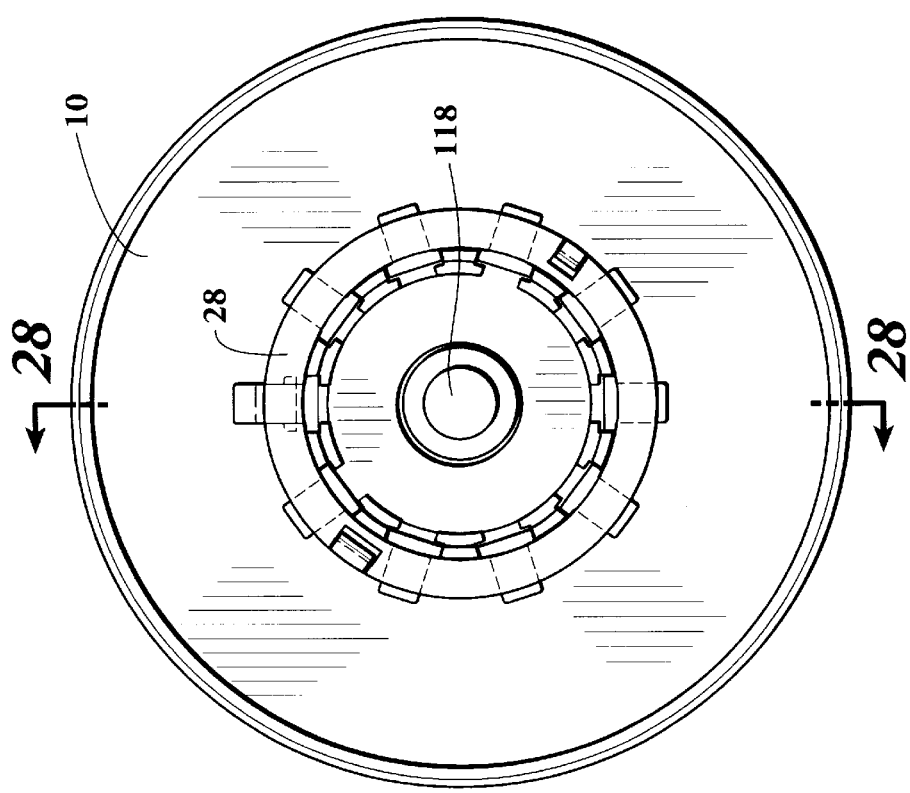
FIG. 27 provides a forward end elevational view of a spool assembly including inventive brake element assembly 28.

As depicted in FIGS. 15–17, each brake element 34 is preferably a T-shaped pad or weight having: a longitudinal axis 40; a wide retaining end 42; an elongate portion 44 extending from retaining end 42; and a pair of retaining shoulders 46 defined by the transition from retaining end 42 to elongate portion 44. Elongate portion 44 has a tapered distal end 48 positioned opposite retaining end 42. Braking element 34 preferably has both a flat forward surface 50 and a flat rearward surface 52. The transition 51 from forward surface 50 to distal end 48 is preferably curved in the manner depicted in FIG. 16.

As used herein, the terms "forward" and "forwardly facing" describe features facing and/or positioned away from the left longitudinal end of line spool 10. The terms "rearward" and "rearwardly facing," on the other hand, describe features facing and/or positioned toward the left end of spool 10.

As depicted in FIGS. 18–22, brake element housing 36 is preferably a substantially cylindrical member having: a longitudinal axis of rotation 54; a longitudinal forward end 56; a longitudinal rearward end 58; a first cylindrical bore 60 extending into housing 36 from forward end 56; a second cylindrical bore 62 extending further into housing 36 from bore 60, second bore 62 having a smaller diameter than first bore 60; an interior radial shoulder 64 defined by the transition from bore 60 to bore 62; a third cylindrical bore 66 extending from bore 62 through the rearward end 56 of housing 36, third bore 66 having a smaller diameter than second bore 62; and an interior radial shoulder 68 defined by the transition from bore 62 to bore 66. Bores 60, 62, and 66 respectively define longitudinal interior cylindrical walls 70, 72, and 74. Housing 36 further comprises: a substantially cylindrical primary outer wall 76 extending from rearward end 58 and having formed therein longitudinal, U-shaped grooves 78; a second, and much shorter, outer cylindrical wall 80 extending from primary outer wall 76 to forward end 56, outer wall 80 having a smaller diameter than that of primary outer wall 76; and an exterior radial shoulder 82 defined by the transition from primary outer wall 76 to outer wall 80.

Longitudinal exterior grooves 78 are provided in outer wall 76 primarily to accommodate the formation of housing 36 using a standard molding process. Grooves 78 give housing 36 a more consistent thickness profile and thereby enhance the dimensional stability and minimize distortion of housing 36 during the cooling cycle of the molding process.

Housing 36 has a plurality of (preferably in the range of from about 4 to about 10) radial slots 84 formed therein for slidably retaining brake elements 34. Each radial slot 84 extends a limited longitudinal depth into housing 36 from forward end 56. Since slots 84 do not extend through rearward end 58, each slot has a flat, radial bottom surface 86. Each radial slot 84 therefore has a longitudinal depth defined as the distance from forward end 56 of housing 36 to the slot's bottom surface 86.

For reasons discussed below, each individual slot 84 preferably has a depth which differs from the depths of at least some of the other slots 84. Most preferably, the depth of each individual slot 84 differs from the depths of all other slots 84. For example, assuming the housing 36 depicted in FIGS. 18–22 has a total longitudinal length of 0.140 inches, slots 84a, 84b, 84c, 84d, 84e, 84f, 84g, 84h, 84i, and 84j provided in housing 36 will preferably have approximate depths of 0.070, 0.075, 0.080, 0.085, 0.090, 0.095, 0.100, 0.105, 0.110, and 0.115 inches, respectively.

Each of slots 84 preferably has a t-shaped radial cross section including: a substantially straight outer segment 88 extending radially through primary outer wall 76; a substantially straight inner segment 90 extending radially inward through interior cylindrical wall 72; and a substantially straight intermediate segment 92 extending between segments 88 and 90. The width of intermediate segment 92 is greater than the respective widths of segments 88 and 90 such that retaining shoulders 94, 96, 98, and 100 are provided in slots 84.

Slots 84 and brake elements 34 are sized such that the widths of the retaining ends 42 of brake elements 34 are less than the widths of intermediate slot segments 92 but greater than the widths of inner and outer slot segments 88 and 90. Thus, when the wide retaining ends 42 of brake elements 34 are placed in intermediate slot segments 92, brake elements 34 are slidably retained in slot 84. As brake elements 34 slide radially outward in slots 84 away from rotational axis 54, the retaining shoulders 46 provided on brake elements 34 eventually abut slot shoulders 94 and 96 and thereby prevent braking elements 34 from sliding out of housing 36. When, on the other hand, brake elements 34 slide radially inward toward rotational axis 54, the wide ends 42 of elements 34 eventually abut slot shoulders 98 and 100 and prevent brake elements 34 from falling into the interior of housing 36.

Radial slots 84 extend longitudinally into housing 36 from forward end 56 such that slots 84 pass through exterior radial shoulder 82 and interior radial shoulders 64 and 68. Additionally, slots 84 extend radially from interior cylindrical wall 72 to primary outer cylindrical wall 76 such that slots 84 create openings 102 in interior cylindrical wall 72 and openings 106 in primary outer wall 76.

The formation of slots 84 through forward end 56 of housing 36 in the manner just described creates a plurality of forwardly projecting ribs 108 around which housing cover 38 is positioned. Housing 36 also includes an opposing pair of integral, forwardly projecting chamfers 110 used for removably snapping cover 38 onto forward end 56.

As shown in FIGS. 12–14, 23, and 24, housing cover 38 preferably comprises a ring structure 111 sized for attachment to forward end 56 of housing 36 around housing ribs 108. Cover 38 includes a pair of opposing outer grooves 112 having lips 114 provided therein such that grooves 112 are operable for receiving and snapably retaining housing chamfers 110.

Cover 38 further comprises a plurality of rearwardly facing radial ribs 116. Ribs 116 extend into housing slots 84 for retaining braking elements 34 in substantially fixed longitudinal positions. The number of radial ribs 116 provided on cover 38 corresponds to the number of slots 84 provided in housing 36. Radial ribs 116 preferably have differing longitudinal lengths corresponding to the differing depths of the slots 84. Thus, for example, when employed in slots 84, a, b, c, d, e, f, g, h, i, and j, ribs 116a, b, c, d, e, f, g, h, i, and j will preferably have longitudinal lengths of approximately 0.007, 0.012, 0.017, 0.022, 0.027, 0.032, 0.037, 0.042, 0.047, and 0.052 inches, respectively.

When cover 38 is removed from housing 36, brake elements 34 can be placed in and removed from slots 84. As seen in FIGS. 12–14 and 27–30, brake elements 34 are preferably placed in slots 34 such that: rearward element surfaces 52 slidably contact the bottom surfaces 86 of slots 84; the curved portions 51 of brake element distal ends 48 are forwardly oriented; and distal ends 48 taper outwardly toward the rearward end 58 of assembly 28. When oriented in this matter, curved surface 51 and tapered distal ends 48 allow smooth, transitional interaction between brake elements 34 and brake ring assembly 30.

Braking element assembly 28 is secured in reel 2 such that assembly 28 rotates with spool 10. As seen in FIGS. 27–30, cylindrical bore 66 of assembly 28 is preferably press fit onto the end of the spool shaft 118 extending through spool 10. When secured in this manner, the rotational axis 54 of brake element assembly 28 is collinear with the rotational axis of spool 10 and spool shaft 118.

When brake element assembly 28 rotates with spool shaft 118, the resulting centrifugal force imparted to brake elements 34 urges elements 34 to slide radially outward in slots 84 away from axis 54. Braking elements 34 are sized such that, at least when elements 34 slide into their outermost radial positions, the distal ends 48 of elements 34 project radially outward from housing 36 through the slot openings 106 formed in primary outer wall 76. In this preferred embodiment of assembly 28, brake elements 34 must, at some point, project from openings 106 in order to operably interact with brake ring assembly 30. In the embodiment depicted in FIGS. 12–14 and 27–30, brake elements 34 are sized such that distal ends 48 always project from slot openings 106, regardless of the specific radial positions of elements 34.

As shown in FIGS. 2–6, brake dial 24 is preferably a cup-shaped member having: a smooth, rounded forward surface 120; an open rearward end 121; and a radial flange 122 formed around rearward end 121. Forward surface 120 projects through circular aperture 26 provided in cover 20. The interior of dial 24 includes a pair of sloped, semicircular cam ramps 130. The interior of dial 24 also includes a centrally positioned, cylindrical cup 132 defined by a rearwardly projecting cylindrical wall 134. The smooth outer surface 120 of dial 24 presents no obstructions on which the fishing line can be accidentally caught or snagged. Dial 24 is rotatably retained in aperture 26 by the abutment of radial flange 122 with a radial shoulder 124 formed in cover 20 around aperture 26. As an audible means of detecting dial movement, serrations 126 are preferably provided on the rearward face of radial flange 122 for clicking interaction with a clicker spring 128 secured to the interior of cover 20.

As seen in FIGS. 7–11, the cam slider 32 used in the inventive braking apparatus preferably comprises: a substantially cylindrical central portion 136 having a cylindrical bore 138 extending longitudinally therethrough; a circular groove 140 formed on the rearward side 142 of cylindrical portion 136 around bore 138; a pair of flat, opposing ears 144 extending radially from cylindrical portion 136; and a pair or internally threaded bosses 146 positioned near the radial ends of ears 144 and projecting rearwardly from the rearward faces 147 of ears 144. Cam slider 32 further comprises sloped cam ramps 148, projecting from the forward surfaces 150 of ears 144, for operative engagement with camp ramps 130 provided in the interior of dial 24.

Brake dial 24 and cam slider 32 are operably positioned and retained within cover 20 by means of a spool retainer 152. Retainer 152 comprises: a substantially circular interior plate 154 having apertures 156 formed therethrough for attaching retainer 152, by means of bolts 160, to threaded bosses 158 provided in cover 20; a cylindrical guide post 162 projecting from the forward side 164 of plate 154; and a cylindrical structure 166, projecting from the rearward side 168 of plate 154. Cylindrical structure 166 holds a spool shaft bearing 174 in which the left end of spool shaft 118 is rotatably received.

As seen in FIGS. 25 and 26, brake ring assembly 30 provides a braking contact member preferably comprising a cylindrical brake ring 172 having a cylindrical interior surface 174. Brake ring 172 is axially positionable around brake element assembly 28 such that brake elements 34, when projecting a sufficient radial distance from brake element housing 56, will frictionally contact interior surface 174. Brake ring assembly 30 further comprises a radial flange 176, provided around the exterior of brake ring 172, and a pair of attachment ears projecting outwardly from radial flange 176. Attachment ears 178 have cylindrical bores 180 provided therethrough for attaching brake ring assembly 30 to the rearward ends of the threaded bosses 146 provided on cam slider 32.

As depicted in FIGS. 2 and 27–30, the inventive braking apparatus is preferably assembled such that: brake dial 24 is positioned in cover aperture 26; cam slider 32 is positioned rearwardly of dial 24 such that cam ramps 130 provided in dial 24 operably interact with cam ramps 148 provided on slider 32; retainer guidepost 162 extends forwardly through cam slider bore 138 and is received in interior dial cup 132; cam slider bosses 146 slidably extend rearwardly through apertures 182 provided in retainer plate 154; and brake ring assembly 30 is reciprocatably secured between retainer 152 and spool 10 by attaching brake flange 176 to cam slider bosses 146 using bolts 184. The assembled braking apparatus preferably also includes both a friction-reducing O-ring 185 provided in interior dial cup 132, for facilitating the rotation of dial 24, and a spring 188 positioned around retainer guide post 162 between retainer 152 and cam slider 32. The forward end of spring 188 is received in cam slider groove 140 and exerts a continuous, forward biasing force on cam slider 32 whereby cam ramps 130 of dial 24 and cam ramps 148 of cam slider 32 are maintained in operative contact.

Figure 30:
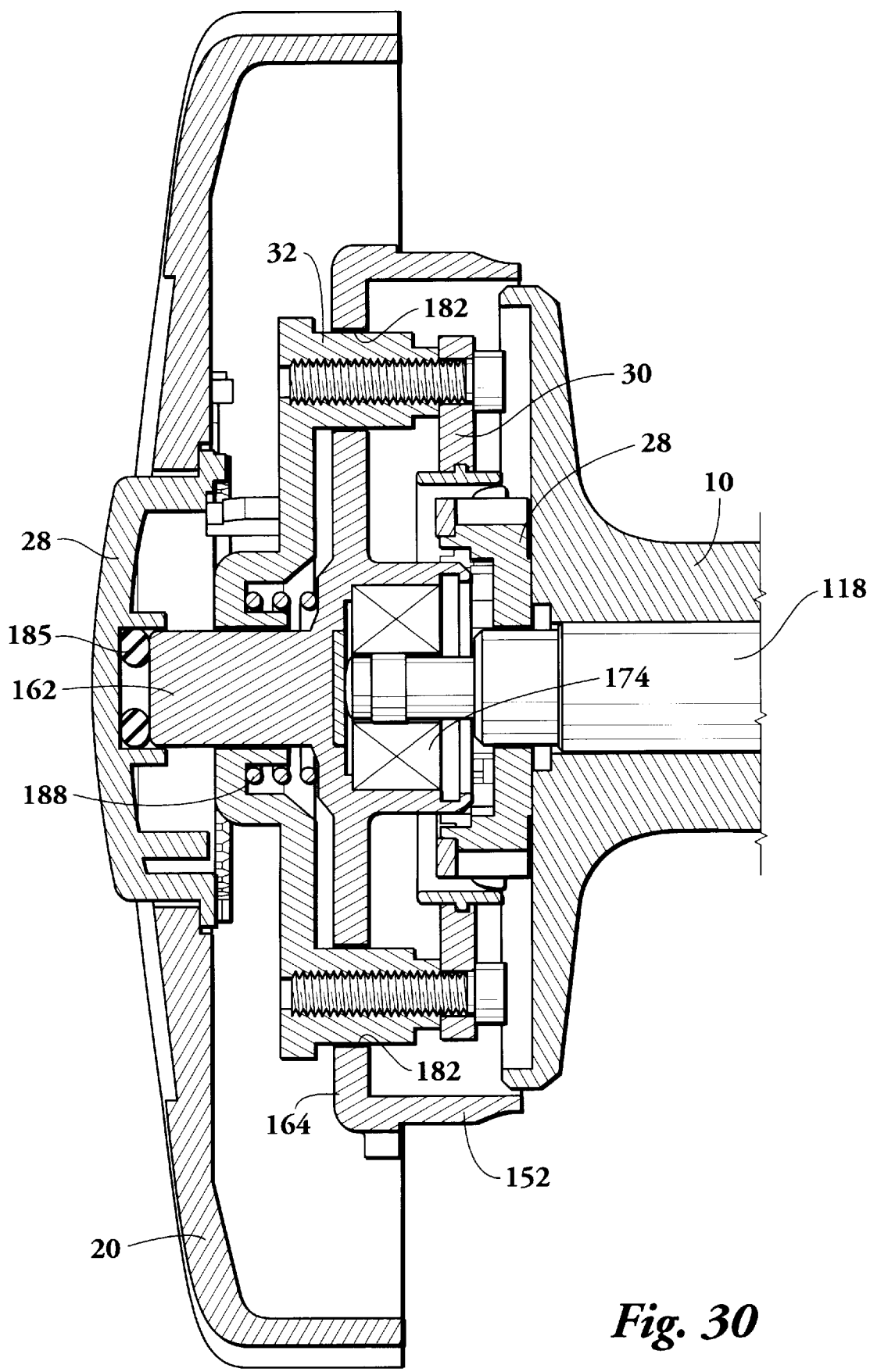
FIG. 30 provides another cutaway view of the assembled inventive braking apparatus wherein brake ring assembly 30 is positioned for frictional engagement with the brake pads 34 of inventive braking element assembly 28.

When dial 24 is rotated clockwise, cam ramps 130 interact with cam ramps 148 to exert a rearward force on cam slider 32 such that cam bosses 146 slide rearwardly through retainer apertures 182. The rearward movement of cam bosses 146 carries brake ring assembly 30 rearwardly such that brake ring 172 moves into a braking position around braking elements 34. One braking position of brake ring 172 is depicted in FIG. 30.

Figure 29:
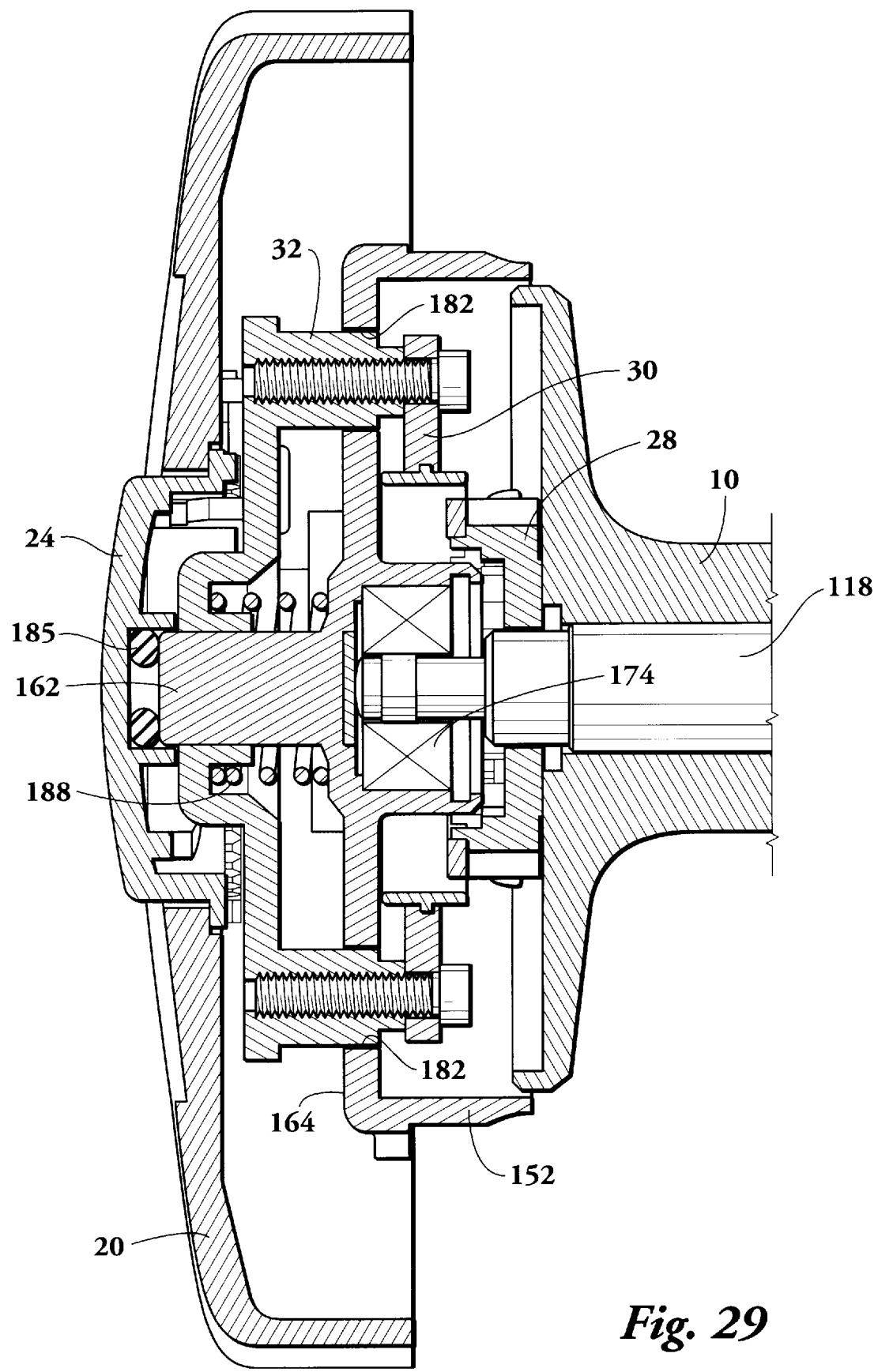
FIG. 29 provides a cutaway view of the assembled inventive braking apparatus wherein brake ring assembly 30 is positioned out of engagement with inventive brake element assembly 28.

By rotating dial 24 counterclockwise, the user can move brake ring 172 forwardly in order to either decrease the degree of braking provided by the inventive system or move brake ring 172 completely out of any possible braking interaction with brake elements 34. FIG. 29 depicts brake ring 172 in a fully forward position wherein brake elements 34 cannot frictionally contact brake ring 172.

The inventive braking apparatus can be easily adjusted without removing reel cover 20 and without disassembling the reel. The invention apparatus also provides a broad and full braking force adjustment range. Brake ring 172 can be positioned at extreme locations wherein either all of brake elements 34 will fully contact brake ring 172 or none of brake elements 34 can contact brake ring 172. Additionally, the inventive system provides a wide range of adjustment between the full contacting and non-contacting positions of brake ring 172. Since the slots 84 provided in brake element housing 36 have differing longitudinal depths, the longitudinal axis 40 of each brake element 34 lies in a radial plane having a longitudinal position which is different from the longitudinal positions of the radial planes defined by the axes 40 of the other brake elements 34.

Thus, as brake ring 172 is adjusted axially over braking element assembly 28 from the noncontacting position shown in FIG. 29 to a full contacting position, the brake ring sequentially moves into contacting position with respect to the individual brake elements in slots 84a through 84j. Moreover, due to the curved and rearwardly diverging shape of the distal ends 48 of braking elements 34, the amount of frictional braking force exerted by each individual braking element 34 increases as the point of contact between brake ring surface 174 and the distal end 48 of the brake element 34 shifts rearwardly along end 48.

It will also be understood by those skilled in the art that, although the inventive braking element assembly 28 herein described is preferred, other types of braking element assemblies (e.g., braking weights, pads, and/or bristles slidably mounted on radially extending rods) can be used in the inventive braking apparatus. However, regardless of the type of assembly used, it is preferred that some or all of the individual braking elements be positioned at differing longitudinal locations along the assembly's rotational axis so that the brake ring will sequentially encompass additional elements or additional groups of elements as the brake ring is adjusted from a noncontacting position to a full contacting position.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:
    a contact member selectively positionable in at least a first location and a second location, said second location being different from such first location, and
    a plurality of braking elements having individual braking positions for contacting said contact member to thereby create a frictional braking force, said braking elements being radially positioned about a rotational axis,
    wherein, when said contact member is positioned in said first location and said braking elements are in said individual braking positions, at least a first one of said braking elements will contact said contact member, and
    wherein, when said contact member is positioned in said second location, a second one of said braking elements will contact said contact member but said first one of said braking elements cannot contact said contact member regardless of whether said first one of said braking elements is in its said individual braking position.

2. The braking apparatus of claim 1 wherein, when said contact member is positioned in said first location and said braking elements are in said individual braking positions, all of said braking elements will contact said contact member.

3. The braking apparatus of claim 1 wherein said contact member is also selectively positionable in a third location such that none of said braking elements can contact said contact member regardless of whether said braking elements are in said individual braking positions.

4. The braking apparatus of claim 1 wherein:
    when said contact member is positioned in said first location, at least one of said braking elements cannot contact said contact member;

said contact member is selectively positionable in a third location; and when said contact member is positioned in said third location and said braking elements are in said individual braking positions, all of said braking elements contact said contact member.

5. The braking apparatus of claim 1 wherein:

each of said braking elements has a distal end positioned away from said rotational axis;

said contact member is positioned around said rotational axis;

said contact member is movable along said rotational axis for selectively surrounding said braking elements such that, when said contact member surrounds said braking elements and said braking elements are in said individual braking positions, said distal ends contact said contact member.

6. The braking apparatus of claim 1 wherein:

each of said braking elements has a radial path;

said braking elements are slidably retained in said radial paths for sliding movement toward and away from said rotational axis; and when a centrifugal force is imparted to said braking elements by rotating said braking elements about said rotational axis, said centrifugal force will urge said braking elements to slide directionally in said radial paths away from said rotational axis and toward said individual braking positions.

7. The braking apparatus of claim 1 wherein:

said first one of said braking elements has a first element longitudinal axis lying in a first plane substantially perpendicular to said rotational axis, said second one of said braking elements has a second element longitudinal axis lying in a second plane substantially perpendicular to said rotational axis, and said second plane is spaced apart from said first plane.

8. The braking apparatus of claim 7 wherein:

a third one of said braking elements, has a third element longitudinal axis lying in a third plane substantially perpendicular to said rotational axis, said third plane is a spaced apart from said first plane, and said third plane is spaced apart from said second plane.

9. The braking apparatus of claim 1 further comprising:

retaining means for retaining said braking elements in radial paths about said rotational axis such that a centrifugal force imparted to said braking elements by rotating said braking elements about said rotational axis will urge said braking elements to move directionally in said radial paths away from said rotational axis toward said individual braking positions.

10. The braking apparatus of claim 9 wherein:

said contact member is a brake ring positioned around said rotational axis and having a fully cylindrical interior braking surface and said braking apparatus further comprises positioning means for selectively positioning said brake ring in at least said first location and said second location by moving said brake ring axially along said rotational axis.

11. The braking apparatus of claim 10 wherein:

each of said braking elements has a distal end positioned away from said rotational axis and said positioning means is operable for positioning said fully cylindrical braking surface around said braking elements such that said distal ends will contact said fully cylindrical braking surface when said braking elements are in said individual braking positions.

12. The braking apparatus of claim 10 wherein:

said fishing reel comprises a spool assembly including a rotatable spool shaft;

said fishing reel further comprises a side cover positioned over an end of said spool shaft;

said retaining means is secured to said spool shaft such that said retaining means will rotate with said spool shaft; and said braking apparatus further comprises holding means, attached to said side cover, for holding said positioning means such that said contact member will not rotate with said spool shaft.

13. A braking element assembly for use in a fishing reel braking system, said braking element assembly comprising:

a housing having a longitudinal axis and an outer wall positioned around said longitudinal axis;

a plurality of radial slots provided in said housing and having slot openings extending through said outer wall; and a plurality of braking elements slidably retained in said slots for radial movement toward and away from said longitudinal axis, said braking elements having distal ends positioned away from said longitudinal axis;

wherein, when a centrifugal force is imparted to said braking elements by rotating said housing about said longitudinal axis, said centrifugal force will urge said braking elements to move radially away from said longitudinal axis toward individual, extended radial positions; and wherein, at least when said braking elements are in said individual, extended radial positions, said distal ends of said braking elements project radially from said outer wall through said slot openings.

14. The braking element assembly of claim 13 wherein:

said housing has a longitudinal end;

a first one of said braking elements is slidably retained in said housing at a first longitudinal position spaced a first distance from said longitudinal end;

a second one of said braking elements is slidably retained in said housing at a second longitudinal position spaced a second distance from said longitudinal end; and said second longitudinal distance is greater than said first longitudinal distance.

15. The braking element assembly of claim 14 wherein:

a third one of said braking elements is slidably retained in said housing at a third longitudinal position spaced a third distance from said longitudinal end and said third longitudinal distance is greater than said second longitudinal distance.

16. The braking element assembly of claim 13 wherein said housing comprises:

a housing body, and a housing cover positioned over a longitudinal end of said housing body, wherein said slots are provided in said housing body and are accessible from said longitudinal end of said housing body such that, when said housing cover is removed from said longitudinal end of said housing body, said braking elements can be placed in and removed from said slots.

17. The braking element assembly of claim 16 wherein:
a first one of said slots has a first longitudinal depth measured from said longitudinal end;
a second one of said slots has a second longitudinal depth measured from said longitudinal end; and
said second longitudinal depth is greater than said first longitudinal depth.

18. The braking element assembly of claim 17 wherein:
said housing cover includes a first radial rib extending a first rib distance, measured from said longitudinal end, into said first slot;
said housing cover includes a second radial rib extending a second rib distance, measured from said longitudinal end, into said second slot; and
said second rib distance is greater than said first rib distance.

19. A braking element assembly for use in a fishing reel, said braking element assembly comprising a plurality of braking elements slidably retained in radially slidable positions about a rotational axis wherein:
a first one of said braking elements has a first element longitudinal axis lying in a first plane substantially perpendicular to said rotational axis;
a second one of said braking elements has a second element longitudinal axis lying in a second plane substantially perpendicular to said rotational axis; and
said second plane is spaced apart from said first plane.

20. The braking element assembly of claim 19 wherein;
a third one of said braking elements has a third element longitudinal axis lying in a third plane substantially perpendicular to said rotational axis;
said third plane is spaced apart from said first plane; and
said third plane is spaced apart from said second plane.

21. A braking element assembly, for use in a fishing reel, comprising a plurality of braking elements retained about a rotational axis for reciprocating radial movement with respect to said rotational axis, wherein:
a first one of said braking elements is retained with respect to said rotational axis at a first longitudinal location;
a second one of said braking elements is retained with respect to said rotational axis at a second longitudinal location; and
said second longitudinal location is different, at least with respect to its longitudinal position, from said first longitudinal location.

22. The braking element assembly of claim 21 wherein:
a third one of said braking elements is retained with respect to said rotational axis at a third longitudinal location and
said third longitudinal location is different, at least with respect to its longitudinal position, from said first and said second longitudinal locations.

* * * * *